Nov. 15, 1966    H. HEGENBART    3,285,061
HYDRAULIC TELETRANSMISSION SYSTEM, COMPRISING
TRANSMITTER AND RECEIVER
Filed Dec. 9, 1963
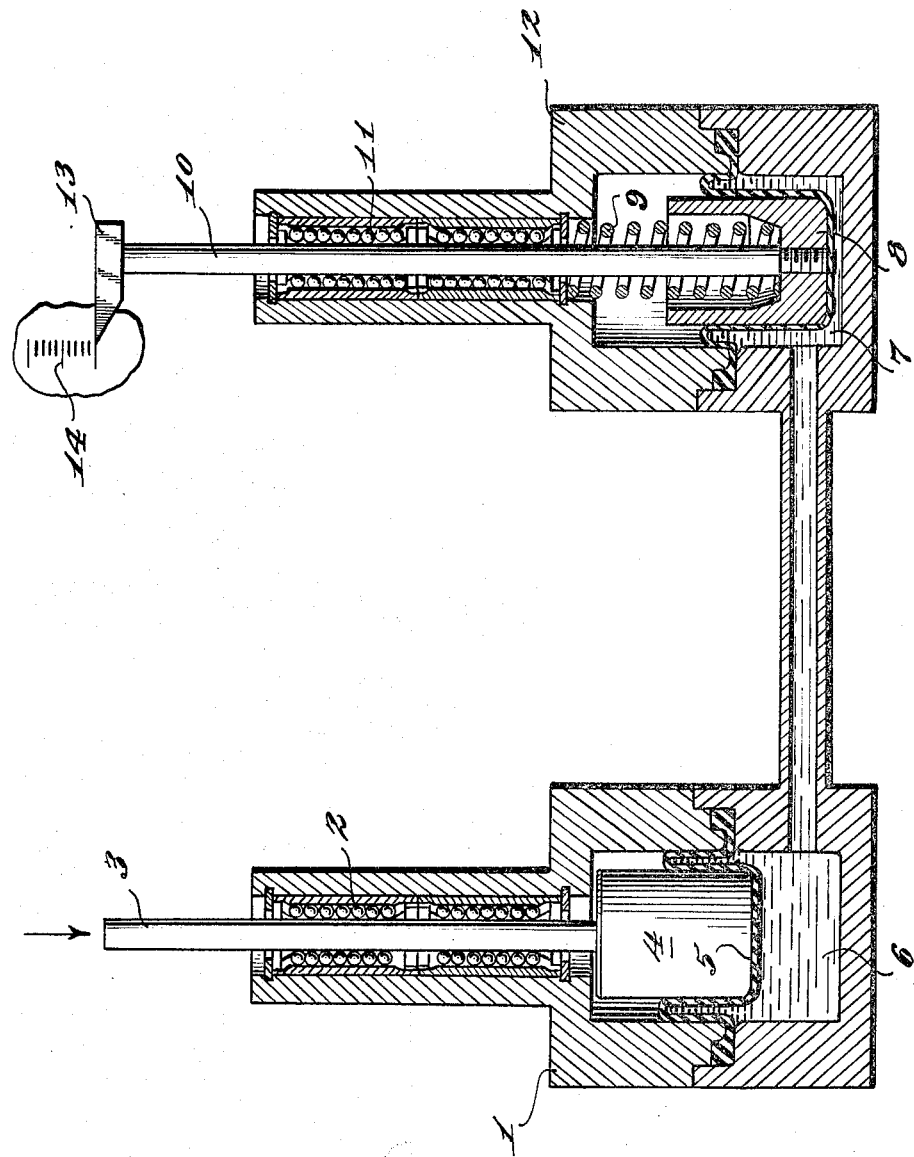
INVENTOR
HORST HEGENBART
BY Cushman, Darby & Cushman
ATTORNEYS

United States Patent Office 3,285,061
Patented Nov. 15, 1966

3,285,061
HYDRAULIC TELETRANSMISSION SYSTEM, COMPRISING TRANSMITTER AND RECEIVER
Horst Hegenbart, 27 Ketteler Str.,
Heppenheim, Hesse, Germany
Filed Dec. 9, 1963, Ser. No. 329,180
2 Claims. (Cl. 73—141)

In the case of many testing and measuring arrangements it is necessary to have the indication system spatially remote from the measuring device. The teletransmission of the forces and/or of the positions to be measured and indicated thereby required mostly will be performed by electrical means. For this costly transducing equipment is necessary, furthermore transmission of the measured values is no longer possible in the case of a power failure.

An arrangement for the shifting of a setting member has already become known at which pneumatic or hydraulic means are provided for transmission. However, this arrangement permits only digital, i.e. unstable teletransmission of values. In addition to this it also makes use of electric auxiliary devices.

The invention has for its object to establish a hydraulic teletransmission system composed of a transmitter and a receiver for the analogous, no-loss power transmission of measured forces and/or for the analogous, play-free transmission of measured positions.

The method according to the invention achieves solution of the given problem in that the transmitter piston rod and the receiver piston rod are carried in axial spherical guides, that transmitter and receiver pistons are sealed by a roller diaphragm toward the cylinder and that the measuring and/or return spring is arranged on the receiver.

A further feature for a practical development of the invention is that transmitter and receiver pistons are different in diameter. The suggested use of axial spherical guides in conjuiction with roller diaphragms results in an almost complete absence of friction. Besides, the roller diaphragms provided substantially insure free play. The free play is further favored in that the spring provided as return spring and/or measuring means is not arranged in the transmitter but in the receiver whereby the hydraulic transmission means will continuously be kept under pressure.

The accompanying drawing illustrates by way of example a design of the device according to the invention.

FIGURE 1 illustrates the transmitter housing in which are mounted the spherical guides 2 which axially guide the piston rod 3. To the piston rod 3 there is affixed the piston 4 over which the roller diaphragm 5 is fitted. When operating the piston rod the pressure medium will in direction of the arrow be pressed from the transmitter cylinder compartment into the cylinder compartment 7 of the receiver. Thus the piston 8 of the receiver will be axially displaced. The spring 9 can either be designed as pressure measuring spring or merely as return spring. Thereby, the piston rod 10 of the receiver will shift in definite, analogous correlation to the shifting of the transmitter piston rod 3 in the spherical guides 11 of the receiver cylinder 12.

The measured value will be indicated visually by the pointer 13 on a scale 14.

By selecting different diameters of the pistons 4, 8 one will be able to vary the transmission in wide limits with maintenance of the continuity. The possibility of adaptation to the most various measuring problems is hereby provided.

I claim:
1. A hydraulic teletransmission system for analogous no-loss transmission of measuring forces and analogous playfree transmission of measured positions comprising: a transmitter and a receiver each including means defining a cylinder having a piston freely received therein for movement axially within the respective cylinder, a piston rod fixed to each piston and protruding axially therefrom through bearing means in the transmitter and receiver; said bearing means each essentially comprising axial spherical guides, a roller diaphragm fitted over one end of each piston opposite the respective piston rod and secured to the wall of the respective cylinder circumferentially thereof intermediate the ends of the respective cylinder; conduit means extending between and communicating with the transmitter cylinder and the receiver cylinder in communication with the opposite side of each roller diaphragm from that which faces each piston one end; an hydraulic pressure transmission medium filling said conduit means and the transmitter cylinder and receiver cylinder portions in communication with said conduit means; and a spring on said receiver constructed and arranged to urge movement of the receiver piston in a sense to tend to force hydraulic pressure transmission medium from the receiver toward the transmitter to thereby keep the hydraulic pressure transmission medium continuously under pressure.

2. Hydraulic teletransmission system as set forth in claim 1, characterized in that the transmitter and receiver pistons have different diameters.

References Cited by the Examiner
UNITED STATES PATENTS

| | | | |
|---|---|---|---|
| 1,236,532 | 8/1917 | Beard et al. | 177—208 |
| 1,584,958 | 5/1926 | MacClatchie | 177—208 |
| 2,392,702 | 1/1946 | Saunders | 177—208 |
| 2,703,008 | 3/1955 | Seljos et al. | 73—141 |

LOUIS R. PRINCE, *Primary Examiner.*

DONALD O. WOODIEL, *Assistant Examiner.*